United States Patent [19]
Straight

[11] 3,780,827
[45] Dec. 25, 1973

[54] GAS TURBINE EXHAUST NOZZLE

[75] Inventor: David M. Straight, North Olmsted, Ohio

[73] Assignee: The United States of America as represented by the Administrator of the National Aeronautics and Space Administration, Washington, D.C.

[22] Filed: Dec. 19, 1972

[21] Appl. No.: 316,618

[52] U.S. Cl. .............................................. 181/43
[51] Int. Cl. .................................................. F01n
[58] Field of Search .............. 181/43, 33 H, 33 HC, 181/33 HD; 239/265.11, 127.1, 127.3, 132.3; 165/123

[56] References Cited
FOREIGN PATENTS OR APPLICATIONS
796,853  4/1936  France ................................. 181/36

Primary Examiner—Richard B. Wilkinson
Assistant Examiner—Pat Salce
Attorney—N. T. Musial et al.

[57] ABSTRACT

An elongated hollow string is disposed in an exhaust nozzle combustion chamber and communicates with a source of air through hollow struts at one end. The other end of the string is bell-mouth shaped and extends over the front portion of a nozzle plug. The bell-mouth may be formed by pivotally mounted flaps or leaves which are used to vary the exhaust throat area and the area between the plug and the leaves. Air from the engine inlet flows into the sting and also between the combustion chamber and a housing disposed around the chamber. The sting air cools the plug and serves as a low velocity inner core of secondary gas to provide noise reduction for the primary exhaust gas while the other air, when it exits from the nozzle, forms an outer low velocity layer to further reduce noise. The structure produces increased thrust in a turbojet or turbofan engine.

14 Claims, 6 Drawing Figures

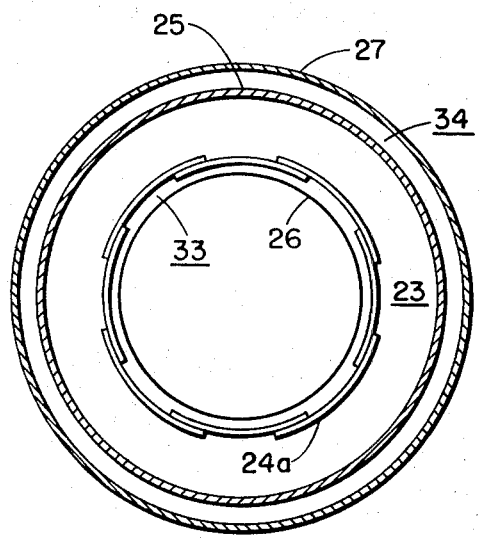
FIG. 2
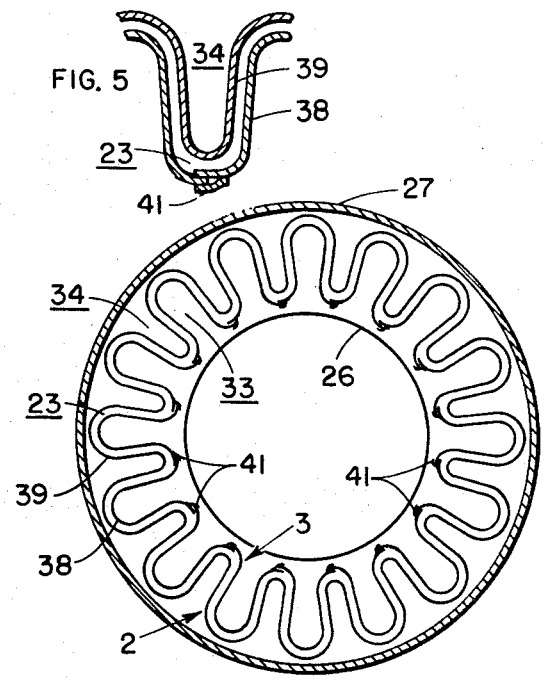
FIG. 5
FIG. 4
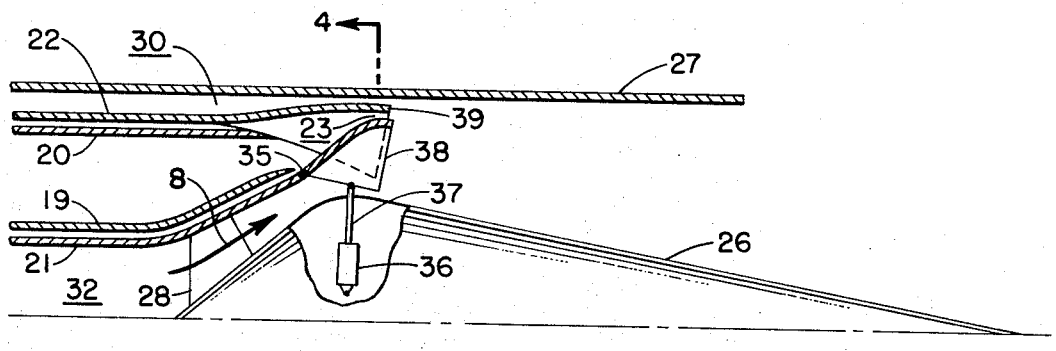
FIG. 3
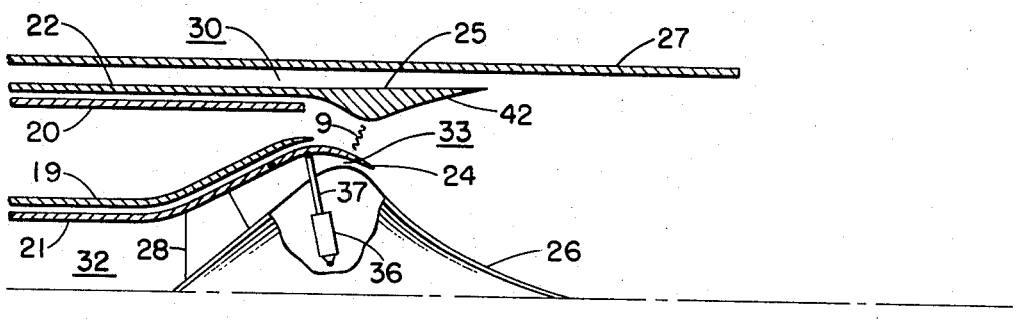
FIG. 6

3,780,827

GAS TURBINE EXHAUST NOZZLE

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to gas turbine engines and is directed more particularly to an exhaust nozzle suitable for use with a gas turbine such as a turbofan or turbojet engine. Considerable work is being done at the present time with regard to reducing the noise of aircraft jet engines both under take-off and landing conditions. Many prior art exhaust nozzles have been built for jet engines, and, while these nozzle substantially reduce noise level, they have done so at a penalty of producing much less thrust. Any loss of thrust is extremely undesirable because the payload of a jet aircraft can be reduced considerably with very minor reductions in thrust. For example, a 1 percent loss of thrust can result in a 10 percent loss in payload.

Other problems arising in exhaust nozzles include cooling the nozzle plug, particularly under afterburning conditions, and minimizing weight in consideration of the apparatus and structure required to reduce noise and to provide cooling for the nozzle.

OBJECTS OF THE INVENTION

It is an object of the invention to provide for a gas turbine engine, an exhaust nozzle in which air is used to provide cooling and to reduce noise, without requiring such air to be obtained from the fans or compressors of the engine.

It is another object of the invention to provide an exhaust nozzle in which noise reduction is achieved by sandwiching the high velocity exhaust gas between first and second layers of low velocity secondary gas or air.

Still another object of the invention is to provide an exhaust nozzle wherein air for cooling and noise reduction reaches the nozzle plug with a small pressure loss penalty.

Yet another object of the invention is to provide an afterburner exhaust nozzle wherein the turbine exhaust gas is routed to cool wall members of the afterburner combustion chamber.

A further object of the invention is to provide an exhaust nozzle wherein actuators for operative members which vary the exhaust nozzle throat area are not in direct contact with the exhaust gas.

It is yet another object of the invention to provide an exhaust nozzle through which the exhaust gas exiting from the nozzle has an inner core and an outer layer of low velocity air which reduces boattail and/or base drag on the primary flaps and/or the outer shroud or nacelle.

An additional object of the invention is to provide for a turbofan or turbojet engine an exhaust nozzle having greatly increased thrust.

BRIEF DESCRIPTION OF THE DRAWINGS

FIG. 2 is a cross sectional view of the exhaust nozzle of FIG. 1 taken along the line 2—2.

FIG. 3 is a longitudinal sectional view of a portion of a nozzle including an alternate embodiment of the invention.

FIG. 4 is a cross sectional view of the exhaust nozzle of FIG. 3 taken along the line 4—4.

FIG. 5 is an enlarged view of a portion of FIG. 4.

FIG. 6 is a longitudinal sectional view of another embodiment of the invention.

DESCRIPTION OF THE PREFERRED EMBODIMENT

Figure 1:
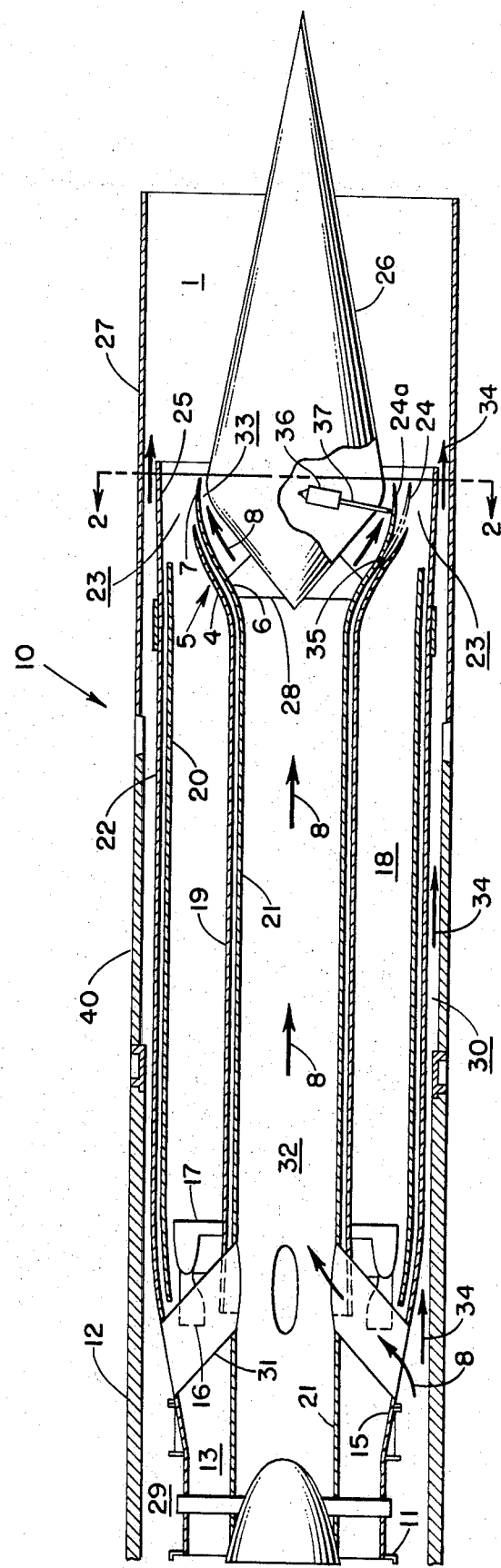
FIG. 1 is a longitudinal section of a gas turbine exhaust nozzle embodying the invention.

Referring now to FIG. 1, there is shown in longitudinal section an exhaust nozzle 10 attached to the rear of a turbojet or a turbofan engine at a flange 11 and at engine nacelle 12. Discharged exhaust gas, the primary gas of the nozzle, flows from the gas turbine engine through an annular passage 13 formed by an elongated sting or pipe 21 and an outer engine wall 15 which expands in a downstream direction from the engine to form a pressure shell 22. The sting 21 is of bell-mouth shape at its downstream end to fit over the front portion of a hollow plug 26 in spaced apart relationship to form an annular passage 33. The bell-mouth is formed of a radially outwardly flared portion 6 and a radially inwardly curving portion 7. The portion 7 may be comprised of leaves 24 which may be disposed partially or completely around the plug 26. The leaves are hinged as at 35 and connected to respective actuators 36 by rods 37 so that the downstream, nonhinged end may be moved toward or away from the plug to vary the area of the annular passage 33. To reduce the area of annular passage 33, each leaf 24 would be moved to a position such as shown at 24a.

From annular passage 13, the exhaust gas flows into the combustion chamber 18 which, like passage 13, is formed by the sting 21 and the shell 22. The flame of the afterburning which takes place in combustion chamber 18 is maintained by an annular flame holder ring 17. Pilot scoops 16 are provided on the flame holder ring 17 to provide flame stability at low flow rates and to assure good ignition limits. To protect the sting 21 and the shell 22 from the extreme heat which may reach 3,500° R in the combustion chamber 18, a sting liner such as a pipe or tube 19 is disposed outside the sting 21 in spaced apart relationship and a combustion liner such as annular wall 20 is disposed inside the shell 22 in spaced apart relationship. With this arrangement some of the gas turbine exhaust which is of considerably lower temperature than the gas which is being afterburned, flows through the annular space between the sting 21 and the sting liner 19 and also flows between the shell 22 and the combustion liner 20 to protect these structures from the extreme temperatures in the combustion chamber 18. The sting liner 19 is outwardly flared adjacent to the outward flare of the sting as at 4. The sting liner 19 and the combustion liner 20 may be convection cooled or film cooled or by combination of these or other known techniques.

The high temperature, after-burned exhaust gas from afterburner combustion chamber 18 flows through the annular convergent-divergent exhaust nozzle throat passage 23 where, because the area of throat passage 23 is much smaller than the area of the combustion chamber 18, it accelerates to produce thrust. The throat area 23 may be varied by movement of the leaves 24 as explained previously with regard to varying the area of the annular passage 33. The area of throat passage 23 is varied as desired to accomodate various levels of afterburning from zero to full afterburning, the latter producing exhaust gas temperatures near 3,500° R.

When the throat area 23 is minimum, exhaust nozzle 10 is in a non-afterburning mode. Likewise, when the leaves 24 are moved radially inward to position 24a to maximize the area of throat 23, full after-burning is taking place. Portion 7 of the bell-mouth 5 served as an inner primary shroud for the annular passage 23 while an extension 25 of the shell 22 serves as an outer primary shroud.

The sting 21 is supported in the exhaust nozzle 10 by hollow struts 31 which place the interior of the sting 21 in communication with an annular passage 29 formed by the nacelle 12 and the engine. Air which is the secondary gas of the nozzle 10 is supplied to the passage 29 from the engine inlet duct and then splits into an inner air stream and an outer air stream.

The inner stream flows from the annular passage 29 through the hollow struts 31 and into the sting 21 as indicated by the arrows 8. The inner stream of air then flows past thin struts 28 which support the hollow plug 26 and impinges on the plug 26 to provide cooling therefor. The inner stream then flows out through the annular passage 33 where it mixes with the afterburned engine exhaust to effect noise reduction which results from mixing the low velocity inner stream of air with the high velocity engine exhaust.

The outer secondary air flows through an annular passage 30 as indicated by the arrows 34. This outer flow of secondary air cools the pressure shell 22 as well as an aft outer shroud 27 which may be attached to the outer shroud 40 to extend axially toward the end of the plug 26. This outer secondary stream of air also mixes with the exhaust gas exiting from the throat 23 and further increases the noise reduction produced by the mixing of the inner stream of secondary air with the exhaust.

The exhaust nozzle of FIG. 1 is of the convergent-divergent type, that is, the flared region 5 of the sting 21 causes the cross sectional area of the throat 23 to be much smaller than the cross sectional area of the combustion chamber 18 and, because of the taper of the rear portion of the plug 26, the cross sectional area of an annular chamber 1 formed by the outer shroud 27 and the plug 26 increases in a downstream direction from the throat 23. At nozzle pressure ratios above the critical pressure ratio at which the velocity of the exhaust gas through the throat passage is in the sonic range, the exhaust gas expands and accelerates supersonically in the annular divergent supersonic diffuser passage defined by the plug wall 26 and aft outer shroud 27, thereby increasing the thrust produced by the nozzle.

While the exhaust nozzles described in the specification include afterburners and nozzle plugs, the invention is suitable for use in the nozzle of an engine which does not utilize afterburning. The invention is also intended for use with or without a nozzle plug and may be used in the exhaust of gas turbine engines such as those used in trucks.

FIG. 2 is a traversed cross sectional view taken along the line 2—2 of FIG. 1. Parts in FIG. 2 corresponding to those of FIG. 1 are identified by like numerals. In FIG. 2, the leaves 24 are shown in maximum closed position whereby the area of the annular throat 23 is maximum for full afterburning while the cross sectional area of the annular passage 33 is at minimum but sufficiently great so that the inner secondary air in sting 21 impinges on and flows past plug 26 to provide cooling therefor.

If the nozzle 10 is constructed such that the curved portions 6 and 7 of the bell-mouth 5 are fixed, the area of the annular throat 23 may be varied by various mechanisms which would cause the outer primary shroud 25 to be capable of being positioned radially inward or outward at the downstream end of the bell-mouth 5. Such articulating mechanisms are known to those skilled in the art and may include leaves attached to shroud 25 similar to the leaves 24.

Structures known in the prior art for exhaust nozzles may also be used in conjunction with the nozzle embodying the invention. For example, the aft outer shroud 27 may be made variable in length by providing suitable actuators and linkages. The aft outer shroud 27 also may be made either longer or shorter than the proportions shown in FIG. 1. Furthermore, the aft outer shroud 27 and/or the thin wall plug 26 may be given acoustic treatment to provide additional noise reduction.

ALTERNATE EMBODIMENTS OF THE INVENTION

FIG. 3 illustrates a portion of an exhaust nozzle which is similar to that shown in FIG. 1 and in which like parts are identified by like numerals. In FIG. 3, the portion 7 of the bell-mouth of FIG. 1 is replaced by a plurality of scoop-shaped sections 38 disposed around the plug 26 to form a corrugated inner ring as shown at 3 in FIG. 4. The sections 38 are linked together by overlapping joints 41 in FIG. 4 and as shown enlarged at 41 in FIG. 5.

The shell 22 terminates as scooped-shaped portions 39 which are fixed and which form an outer corrugated ring as indicated at 2 in FIG. 4.

The scoops 38 pivot radially outwardly or inwardly at hinges 35 to vary the area of the primary exhaust gas throat 23. Because of the inner and outer corrugated rings 2 and 3 of FIG. 4 the throat 23 also has a corrugated annular configuration.

FIG. 6 is another embodiment of the invention and parts corresponding to those in FIG. 1 are identified by like numerals. In the structure of FIG. 6 the outer primary shroud 25 is provided with an inwardly extending annular hump 42. Mechanisms known in the prior art may be utilized to produce longitudinal movement of the shroud 25 resulting in a variation in the area of throat 23 when the hump 42 moves with the shroud 25. The leaves 24 may be actuated as in FIG. 1 whether shroud 25 is fixed or movable.

It will be understood that changes and modifications may be made to the structure described above without departing from the spirit and scope of the invention as set forth in the claims appended hereto.

What is claimed is:

1. A thrust increasing and noise reducing exhaust nozzle for a turbojet or turbofan engine comprising:
   an elongated shell attached at one end to said engine to receive exhaust gas therefrom;
   an elongated hollow body disposed in said shell, said body being closed at one end adjacent said engine and open at its other end;

means for supplying high volume, low velocity, secondary gas to the interior of said elongated hollow body;

a plug longitudinally positioned at said other end of said shell, said plug being of maximum size intermediate its ends, a forward portion of said plug extending into said other end of said elongated body.

2. The apparatus of claim 1 wherein said means for supplying high volume, low velocity gas is the fan of a turbofan engine.

3. The apparatus of claim 1 wherein said means for supplying high volume, low velocity gas is the air intake of a turbojet engine.

4. The apparatus of claim 1 wherein said other end of said elongated body is of generally bell-mouth shape.

5. The structure of claim 4 wherein said shell includes a longitudinally movable outer shroud having an inwardly extending annular hump, said shroud being positioned at said other end of said shell whereby said hump can be positioned upstream or downstream of the maximum size point of said plug to vary the throat area of the primary exhaust gas.

6. The apparatus of claim 4 wherein said other end of said shell is provided with a plurality of leaves pivotally mounted thereon for movement toward and away from said bell-mouth portion to vary the exhaust throat area.

7. The structure of claim 4 and including an afterburner; a sting liner disposed around said elongated body in spaced relationship, one end of said sting liner being upstream of said afterburner whereby turbine exhaust flows into the space between said sting liner and said elongated body, said sting liner being flared at its other end to maintain at the spaced relationship from said flared other end of said elongated body; and a combustion chamber liner disposed inwardly of said shell in spaced relationship and extending from a point upstream of said afterburner to a point downstream of said maximum size of said plug.

8. The structure of claim 4 wherein said bell-mouth extends downstream past said maximum size of said plug.

9. The apparatus of claim 4 wherein said shell terminates at said other end as a plurality of scoops forming a corrugated inner ring and wherein said bell-mouth comprises an outwardly flared portion and scoops forming an inner corrugated ring which meshes in spaced apart relationship with said outer corrugated ring.

10. The apparatus of claim 1 wherein said other end of said elongated hollow body is outwardly flared and including a plurality of leaf members pivotally attached to said flared portion whereby the downstream ends of said leaves may be moved toward and away from said plug, and means for actuating said leaves.

11. The apparatus of claim 10 and including an afterburner; a sting liner disposed around said elongated body in spaced relationship, one end of said sting liner being upstream of said afterburner whereby turbine exhaust flows into the space between said sting liner and said elongated body, said sting liner being flared at its other end to maintain at the spaced relationship from said flared other end of said elongated body; and a combustion chamber liner disposed inwardly of said shell in spaced relationship and extending from a point upstream of said afterburner to a point upstream of said leaves.

12. The apparatus of claim 10 wherein said shell terminates at said other end as a plurality of scoops forming a corrugated outer ring and wherein said leaves are scoops forming a corrugated inner ring.

13. The apparatus of claim 1 and including means for longitudinally positioning said plug.

14. The structure of claim 1 and including a housing disposed around said shell in spaced relationship and hollow struts disposed between said shell and said elongated hollow body to place the interior of said hollow body in communication with the space between said shell and said housing, said space being in communication with said means for supplying low velocity secondary gas.

* * * * *

UNITED STATES PATENT OFFICE
CERTIFICATE OF CORRECTION

Patent No. 3,780,827　　　　　　　　　　　Dated December 25, 1973

Inventor(s) DAVID M. STRAIGHT

It is certified that error appears in the above-identified patent and that said Letters Patent are hereby corrected as shown below:

In the ABSTRACT, line 1, for "string" read --sting--.

line 4, for "string" read --sting--.

Column 5, line 38, for "downstream" read --upstream--.

Column 6, line 4, for "inner" read --outer--.

Signed and sealed this 6th day of August 1974.

(SEAL)
Attest:

McCOY M. GIBSON, JR.　　　　　　　　　C. MARSHALL DANN
Attesting Officer　　　　　　　　　　Commissioner of Patents